(12) United States Patent
Pandian

(10) Patent No.: US 12,147,568 B2
(45) Date of Patent: Nov. 19, 2024

(54) METHOD FOR MANAGING A SENSITIVE DATA

(71) Applicant: THALES DIS FRANCE SAS, Meudon (FR)

(72) Inventor: Gautam Arvind Pandian, Singapore (SG)

(73) Assignee: THALES DIS FRANCE SAS, Meudon (FR)

( * ) Notice: Subject to any disclaimer, the term of this patent is extended or adjusted under 35 U.S.C. 154(b) by 234 days.

(21) Appl. No.: 17/911,691

(22) PCT Filed: Mar. 16, 2021

(86) PCT No.: PCT/EP2021/056686
§ 371 (c)(1),
(2) Date: Sep. 15, 2022

(87) PCT Pub. No.: WO2021/191001
PCT Pub. Date: Sep. 30, 2021

(65) Prior Publication Data
US 2023/0147493 A1   May 11, 2023

(30) Foreign Application Priority Data
Mar. 26, 2020   (EP) .................................. 20315052

(51) Int. Cl.
*G06F 21/62* (2013.01)
*G06F 21/32* (2013.01)

(52) U.S. Cl.
CPC .......... *G06F 21/6245* (2013.01); *G06F 21/32* (2013.01)

(58) Field of Classification Search
CPC ..... G06F 21/6245; G06F 21/32; H04L 9/085; H04L 9/3226
See application file for complete search history.

(56) References Cited

U.S. PATENT DOCUMENTS

| | | | |
|---|---|---|---|
| 2012/0210135 A1 | 8/2012 | Panchapakesan et al. | |
| 2016/0378689 A1 | 12/2016 | O'Hare et al. | |
| 2019/0356650 A1* | 11/2019 | Leavy | H04L 63/06 |
| 2020/0162255 A1* | 5/2020 | Hunt | H04L 63/083 |
| 2020/0228524 A1* | 7/2020 | Szafranski | A63F 13/79 |
| 2020/0412528 A1* | 12/2020 | Saint | H04W 12/068 |
| 2021/0336792 A1* | 10/2021 | Agrawal | H04L 9/30 |

OTHER PUBLICATIONS

International Search Report (PCT/ISA/210) and Written Opinion (PCT/ISA/237) mailed on May 31, 2021, by the European Patent Office as the International Searching Authority for current International Application No. PCT/EP2021/056686—[12 pages].

* cited by examiner

*Primary Examiner* — El Hadji M Sall

(57) ABSTRACT

Provided is a method for managing a sensitive data in which each authentication factor in a set of authentication factors has been uniquely assigned a group containing several secret shares generated by using a secret sharing scheme. It includes verifying via an authentication factor to generate a score reflecting a level of confidence of the verification, wherein a subset of the secret share(s) assigned to the authentication factor is added to a collection, the subset comprising a number of secret share(s) depending on both said score and a predefined parameter associated with the authentication factor. Sensitive data is built from the secret shares of the collection by applying a predefined algorithm associated with the secret sharing scheme.

15 Claims, 4 Drawing Sheets

METHOD FOR MANAGING A SENSITIVE DATA

FIELD OF THE INVENTION

The present invention relates to methods of managing sensitive data. It relates particularly to methods based on multiple authentication factors.

BACKGROUND OF THE INVENTION

Existing authentication mechanisms work independently well by indicating whether a user is authenticated or not, but does not account the strength of the authentication. For biometric authentication, a threshold is usually set by the respective vendors or application integrators. Thresholds are often hardcoded to make it user friendly. When the threshold is barely achieved after multiple retry attempts, the user is authenticated bringing the risk of false acceptance. There is a need for a method allowing to enhance protection of sensitive data, especially in the domain of authentication.

SUMMARY OF THE INVENTION

The invention aims at solving the above mentioned technical problem.

An object of the present invention is a computer-implemented method for managing a sensitive data. Each authentication factor belonging to a set of authentication factors has been uniquely assigned a group containing several secret shares generated by using a secret sharing scheme. The secret shares have been generated from the sensitive data by applying the secret sharing scheme. The method comprises:

- a checking step in which a user provides an input, a verification of said input is performed by using an authentication factor of the set to generate a score reflecting a level of confidence of the verification, a subset of the secret share (s) assigned to the authentication factor is added to a collection, said subset comprising a number of secret share (s) depending on both said score and a predefined parameter associated with the authentication factor,
- a controlling step in which while the collection comprises a number of secret share (s) below a threshold, a further authentication factor is elected in the set and a further checking step is executed with the further authentication factor, and
- a generating step in which, once the number of secret shares belonging to the collection has reached the threshold, the sensitive data is built from the secret shares of the collection by applying a predefined algorithm associated with the secret sharing scheme.

Advantageously, the sensitive data may be an authentication key and the user may be authenticated by using the sensitive data.

Advantageously, once user has been the successfully authenticated, a plurality of new groups of secret shares generated by using the secret sharing scheme may be identified, a new set may be provided by adding a new authentication factor to said set of authentication factors and each authentication factor of said new set may be uniquely assigned a group of said plurality of new groups.

Advantageously, once the user has been successfully authenticated, a plurality of new groups of secret shares generated by using the secret sharing scheme may be identified, a new set may be provided by removing one authentication factor from said set of authentication factors and each authentication factor of said new set may be uniquely assigned a group of said plurality of new groups.

Advantageously, at least one authentication factor of said set may be a biometric authentication factor. Advantageously, the sensitive data may be a key and the sensitive data may be used to decipher an encrypted digital asset.

Advantageously, the preset secret sharing scheme may be the Shamir's secret sharing scheme for the Blakley's secret sharing scheme.

Advantageously, the score may be a number of verification attempt or a percentage of match of captured biometric value with a reference biometric value.

Another object of the present invention is a secure system comprising a processing unit and a storage area. Each authentication factor in a set of authentication factors has been uniquely assigned a group containing several secret shares generated by using a secret sharing scheme. The secret shares have been generated from the sensitive data by using the secret sharing scheme. The storage area comprises instructions that, when executed by said processor, cause said secure system to:

- perform a checking step in which the secure system gets an input from a user, the secure system performs a verification of said input by using an authentication factor of the set and generates a score reflecting a level of confidence of the verification, the secure system adds to a collection a subset of the secret share (s) assigned to the authentication factor, said subset comprising a number of secret share (s) depending on both said score and a predefined parameter associated with the authentication factor,
- perform a controlling step in which while the collection comprises a number of secret share (s) below a threshold, the secure system elects a further authentication factor in the set and executes a further checking step with the further authentication factor, and
- perform a generating step in which, once the number of secret shares belonging to the collection has reached the threshold, the secure system builds the sensitive data from the secret shares of the collection by applying a predefined algorithm associated with the secret sharing scheme.

Advantageously, the sensitive data may be an authentication key and the secure system may authenticate the user by using the sensitive data.

Advantageously, once the user has been successfully authenticated, the secure system may identify a plurality of new groups of secret shares generated by using the secret sharing scheme, the secure system may provide a new set by adding a new authentication factor to said set of authentication factors and the secure system may uniquely assign each authentication factor of said new set a group of said plurality of new groups.

Advantageously, once the user has been successfully authenticated, the secure system may identify a plurality of new groups of secret shares generated by using the secret sharing scheme, the secure system may provide a new set by removing one authentication factor from said set of authentication factors and the secure system may uniquely assign each authentication factor of said new set a group of said plurality of new groups.

Advantageously, the sensitive data may be a key and the secure system may use the sensitive data to decipher an encrypted digital asset.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

In the description detailed below, reference is made to the accompanying drawings that show, by way of specific the illustration, embodiments in which invention may be practiced. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims.

The invention aims at securing access to a sensitive data.

A first aspect of the invention is a method for distributing to a plurality of authentication factors a group of credential associated to a sensitive data.

Figure 1:
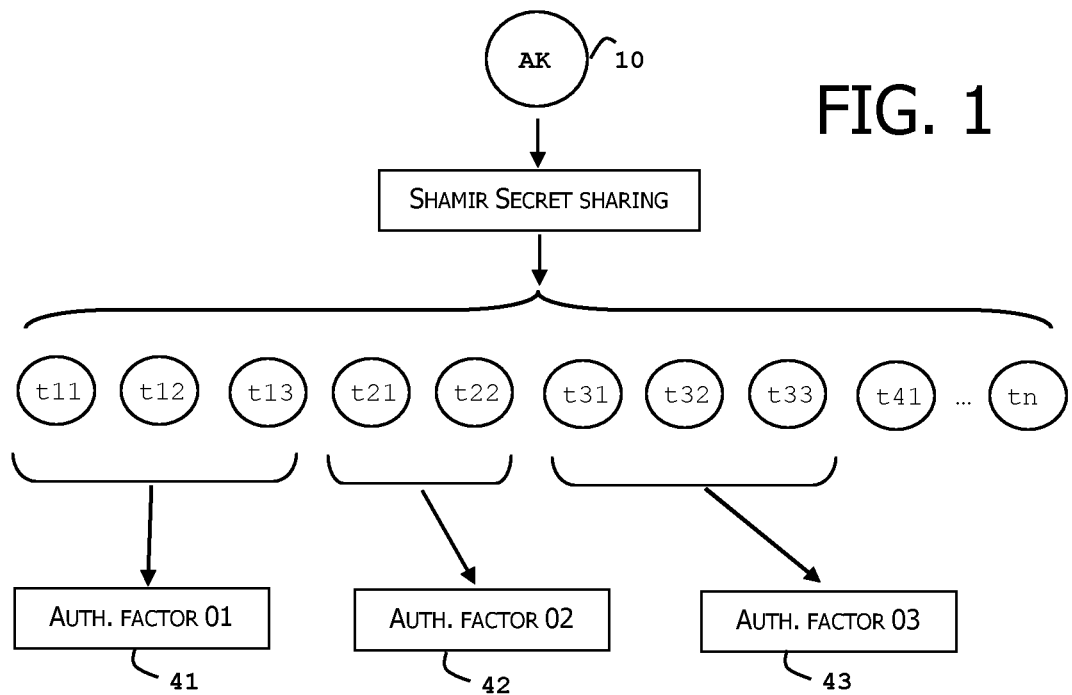
FIG. 1 depicts schematically way to allocate secret shares to a plurality of authentication factors according to a first example of the invention.

In the example of FIG. 1, a sensitive data 10 is identified. For instance, the sensitive data 10 may be a secret Key (AK) which may be used to encipher a digital asset. The sensitive data 10 is associated to a set of authentication factors. In the example of FIG. 1, the set include three authentication factors 41, 42 and 43. An authentication factor device which requires an input to be checked from a user. For instance, an authentication factor may be an authentication device able to capture and check genuineness of a user's biometric data (like fingerprint, face, blood rhythm, iris, voice or palm print.) An authentication factor may be a device able to capture and check genuineness of a user's password or PIN code.

A secret sharing scheme is used for generating a set of secret shares from the sensitive data 10.

The secret sharing scheme (also named secret splitting scheme) refers to method for distributing an initial secret or the information about the initial secret among several units. Each unit is supposed to receive at least a share and the initial secret may be rebuilt only if a sufficient number of shares are gathered.

In the example of FIG. 1, the generated set of secret shares contains n secret shares: t11, t12, t13, t21, t22, t31, t32, t33, t41, . . . , tn.

Several groups of secret shares are then formed. A first group may comprise t11, t12 and t13. A second group may comprise t21 and t22 and a third group may comprise t31, t32 and t33.

Then the first group may be assigned to the first authentication factor 41, the second group may be assigned to the second authentication factor 42 and the third group may be assigned to the third authentication factor 43.

The used secret sharing scheme may be a threshold-based scheme like the Shamir's secret sharing scheme, or the Blakley's secret sharing the Asmuth-Bloom scheme. For such a scheme, a threshold is defined by the minimum number of shares required to rebuild the sensitive data. The total number of secret shares belonging to the groups assigned to the authentication factors is equal to or greater than the threshold.

As illustrated at FIG. 1, only a part of the generated secret shares may be allocated to the identified groups.

Figure 2:
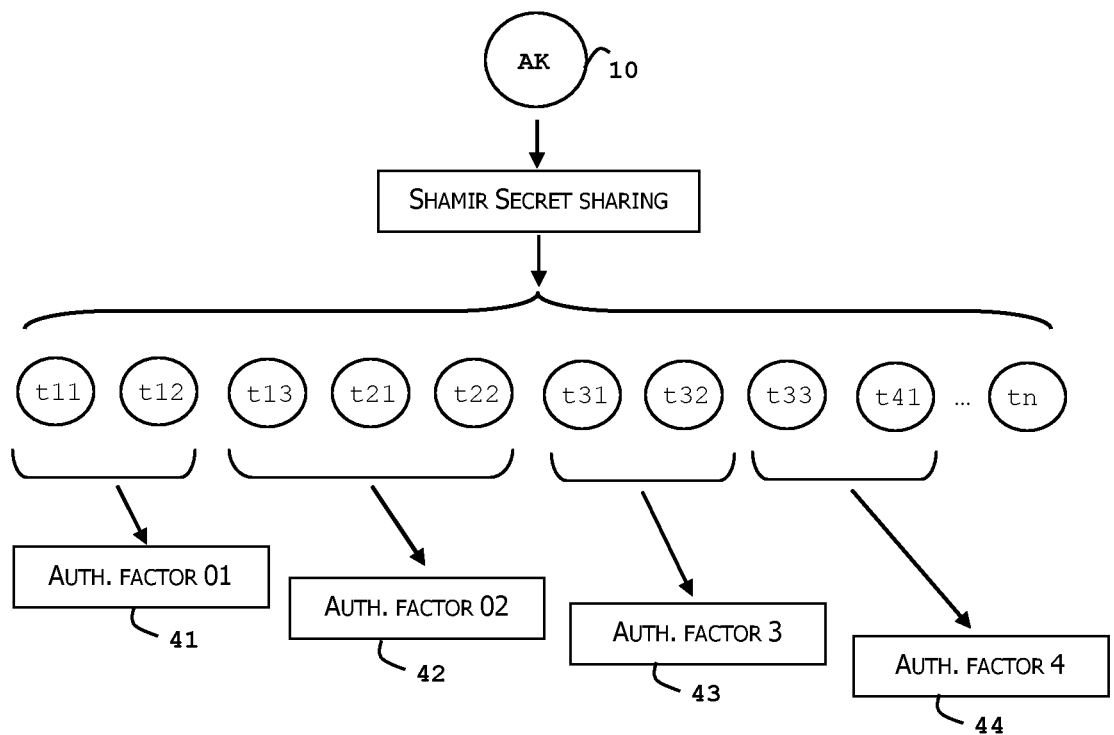
FIG. 2 depicts schematically way to allocate secret shares to a plurality of authentication factors according to a second example of the invention.

The number of secret shares shown at FIGS. 1-2 is provided as example only and may be different.

In one embodiment, the initial value of the sensitive data 10 (when used as a key for enciphering a digital asset) may be generated with a strong entropy such that the cryptographic strength of the key is better than the cryptographic strength of the digital asset. For example, if the digital asset is a RSA private key of size 2048 bits (crypto strength is equivalent to symmetric key of 112 bits), then the sensitive data may be an AES Key of size 128 bits (crypto strength is 128 bits). For example, the value 0 can be discarded when drawing a random number for initializing the value of the sensitive data.

Figure 5:
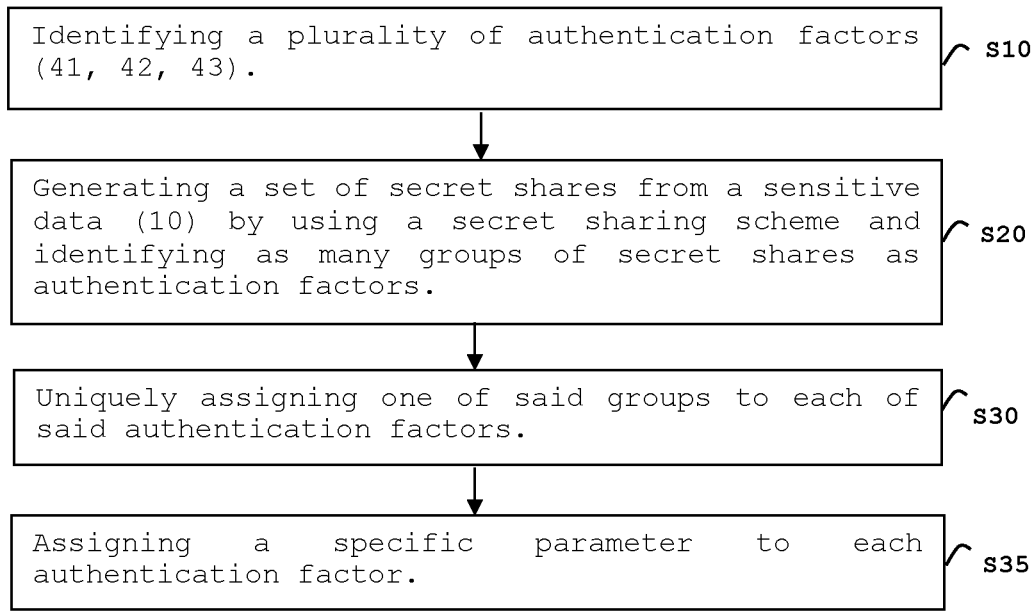
FIG. 5 shows a flow chart of allocation of secret shares to a plurality of authentication factors according to an example of the invention.

FIG. 5 shows a flow chart of the allocation of secret shares to a plurality of authentication factors according to an example of the invention.

Each authentication factor is designed to verify a user input and to generate a score that reflects a level of confidence of the verification performed by the authentication factor.

For instance, an authentication factor designed to verify a password may generate a score depending on the number of false attempt (s) or the time the user took to enter the password. A biometric authentication factor may generate a score depending on the percentage of matching between the values extracted from the captured biometric data and the reference values. A biometric authentication factor may generate a score depending on the number of retries that led to a successful authentication.

Thus the computed score may be a number of verification attempts, a percentage of match of a captured biometric value with a reference biometric value, a number of retries, a duration or any other relevant data linked to the behavior of the user which can be measured by an authentication factor or by the secure system of the invention.

At step S10, a plurality of authentication factors is identified. This action may be performed by selecting several authentication factors according to their availability the field or other criteria specific to the type of the sensitive data or applicative context.

At step S20, a set of secret shares is generated from the sensitive data 10 by using a secret sharing scheme. Then at least as many groups of secret shares as authentication factors are identified. Preferably, each group includes several secret shares.

At step S30, each of said authentication factors is uniquely assigned one of the groups of secret shares.

Steps S20 and S30 may be performed a way similar to the one described at FIG. 1.

A step S35, a specific parameter is assigned to each authentication factor. In other words, each authentication factor is associated to its own specific parameter. A specific parameter specifies how many secret share (s) is/are made available depending on the score computed by its associated authentication factor. Assuming that the authentication factor 41 is designed to check fingerprint, the specific parameter allocated to authentication factor 41 may specify the following rules: If the score is lower than 50%, no secret share is released, if the score is between 50% and 65%, only one secret share is made available, if the score is between 65% and 85%, two secret shares are released and if the score is greater than 85%, three secret shares are made available.

The steps presented at FIG. 5 may be performed in another order or combined. For instance, step S35 may be executed before step S20 or steps S20 may be split in two steps.

Another aspect of the invention is a method for rebuilding the sensitive data.

Figure 6:
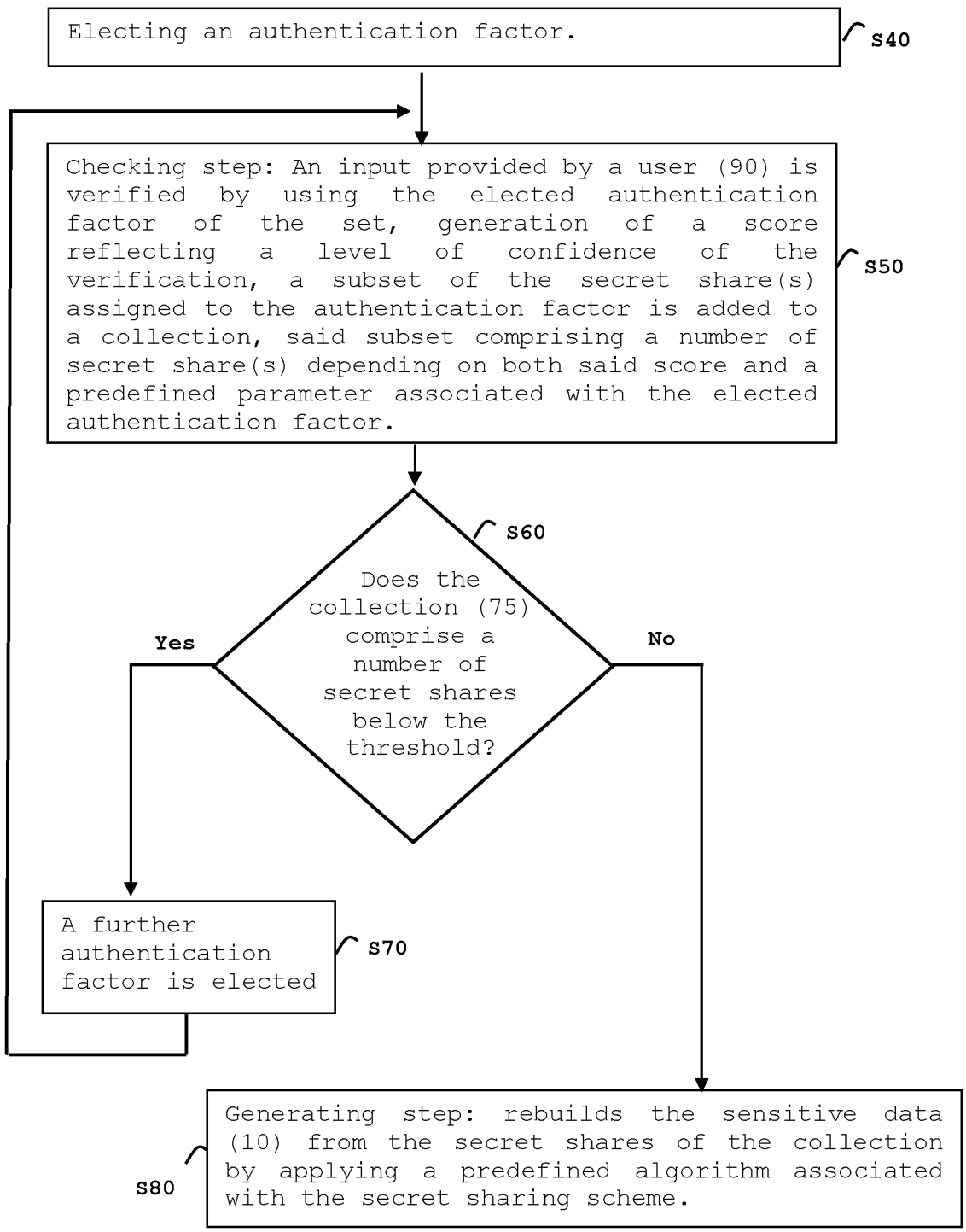
FIG. 6 shows a flow chart for rebuilding a sensitive data according to an example of the invention.

Based on the elements defined at FIG. 1, FIG. 6 shows a flow chart for rebuilding the sensitive data 10 according to an example of the invention.

At step S40, one of the authentication factors is elected in the set of authentication factors. Election may be carried out by selecting a factor at random. Alternatively, an authentication factor may be selected according to a predefined algorithm. Another alternative is selecting an authentication factor based on user choice. For example an ordered list may be used.

At step S50 (Checking step), a user 90 provides an input which is verified by using the elected authentication factor or user chosen authenticator. The authentication factor generates a score reflecting a level of confidence of the verification. A subset of secret share (s) assigned to the elected authentication is identified. This subset comprises a number of secret share (s) depending on both the computed score and the predefined parameter (specific parameter) associated with the elected authentication factor. For example, if the score is between 55% and 70%, only one secret share is placed in the subset. Then the secret shares (s) of the subset is added to a collection.

It is to be noted that the subset may be formed by selecting shares at random or by applying a pre-established rule such as the first x secret shares of an ordered list (of shares belonging to the group of which secret shares must be retrieved.)

Then at step S60, the secure system compares the number of secret shares of the collection with the threshold identified at the stage of secret share generation.

If the collection comprises a number of secret shares below the threshold, a further authentication factor (distinct from the previous one) is elected at step S70 and a new step 50 is performed. (I.e. the process loops). If all (or a predefined number) of available authentication factors have been used without reaching the preset threshold, the secure system may either stop the process (I.e. deny access to the sensitive data) or elect an authentication factor that failed.

If the collection comprises a number of secret shares equal to or greater than the preset threshold, a generating step (step S80) is performed to rebuild the sensitive data 10 from the secret shares of the collection by applying a predefined algorithm associated with the secret sharing scheme. The used predefined algorithm is the construction method of the secret sharing scheme initially used to generate the secret shares.

In one embodiment, the rebuilt sensitive data may be an authentication key and the user may be authenticated by using the sensitive data. For instance a cryptographic signature or certificate associated to the user may be verified by using the authentication key.

In one embodiment, the rebuilt sensitive data may be a key which may be used to decipher an encrypted digital asset. This embodiment allows to grant (or deny) access to a digital asset previously protected with a key related to the rebuilt sensitive data. The rebuilt sensitive data may be a symmetric key or the private key belonging to a PKI pair (Private/public key).

In one embodiment, once the user has been successfully authenticated a new authentication factor may be added to the previous set of authentication factors. A plurality of new groups of secret shares may be identified then each authentication factor of the new set may be uniquely assigned a group of the plurality of new groups.

FIG. 2 illustrates schematically a way to allocate secret shares to a new set of authentication factors. In this example, a new authentication factor 44 is added to the list of authentication factors 41-43 and the secret shares previously generated are kept unchanged.

Four groups of secret shares are then formed. The first group may comprise t11 and t12. The second group may comprise t13, t21 and t22. The third group may comprise t31 and t32 and the fourth group may comprise t33 and t41. Then the first group can be assigned to the first authentication factor 41, the second group can be assigned to the second authentication factor 42, the third group can be assigned to the third authentication factor 43 and the fourth group can be assigned to the fourth authentication factor 44.

In another embodiment, a new authentication factor (or several) may be added to the previous set of authentication factors and new groups of secret shares may be allocated to the authentication factors regardless of whether the user has been authenticated. Such an of authentication factor (s) may be performed by an administrator of the system or the system may allow user to add an authentication factor.

In another embodiment, a new set of secret shares may be generated using the same secret share scheme or another one before the definition of the new groups and their allocation to the authentication factors.

In one embodiment, once the user has been successfully authenticated, an authentication factor may be removed from the previous set of authentication factors. New groups of secret shares may be defined based on previously generated secret shares or newly generated secret shares. Then each authentication factor of the updated set may be uniquely assigned one of the newly defined groups of secret shares.

In another embodiment, one (or several) authentication factor (s) may be removed from the previous set of authentication factors and a new group of secret shares may be allocated to the remaining authentication factors regardless of whether the user has been authenticated. Such a removing action may be performed by an administrator of the system.

Another aspect of the invention is a secure system for managing access to a sensitive data.

Figure 3:
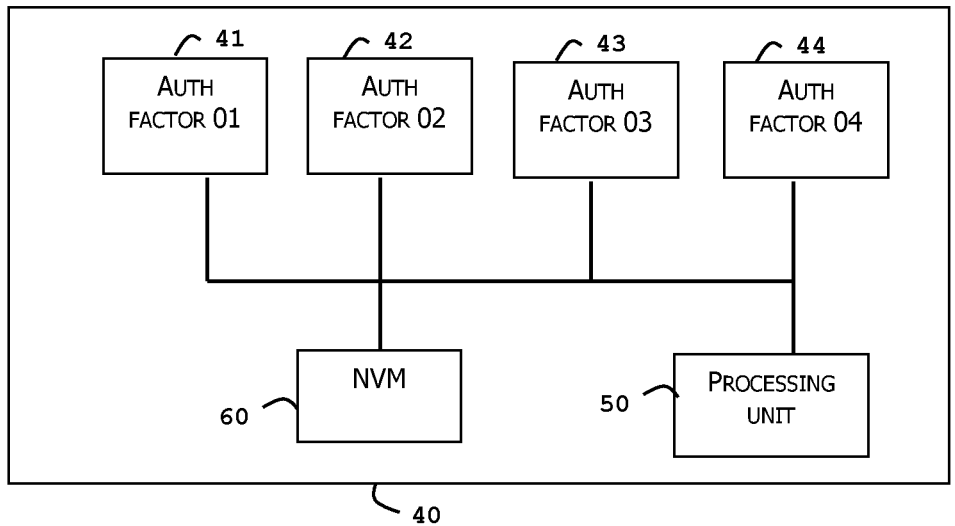
FIG. 3 depicts schematically the architecture of a secure system for managing a sensitive data according an embodiment of the invention.

FIG. 3 describes an exemplary embodiment of such a secure system 40 comprising a processing unit 50, four authentication factors 41-44 and a storage area 60. Although not shown at FIG. 3, the secure system 40 may include a volatile memory (ex: RAM), a communication unit such as an Ethernet or Wi-Fi network adapter, a display and user input means like a keyboard and a mouse. All components of the secure system 40 are coupled (through an internal bus for instance) so as to be able to communicate together.

The processing unit may be a processor or a combination of processors. The storage area 60 may be a non-volatile memory (NVM) that stores a set of instructions intended to be executed by the processing unit 50 to provide the functions required by the invention.

Each of the authentication factors 41-44 has been uniquely assigned a group containing several secret shares generated by using a secret sharing scheme. The secure system 40 is adapted to perform a checking step in which the secure system gets an input from a user, the secure system performs a verification of said input by using one of the available authentication factors 41-44 and generates a score reflecting a level of confidence of the verification, the secure system adds to a collection a subset of the secret share (s) assigned to the authentication factor, said subset comprising a number of secret share (s) depending on both said score and a predefined parameter (specific parameter) associated with the authentication factor.

The secure system 40 is adapted to perform a controlling step in which the secure system compares the number of shares of the collection to the threshold associated to the secret shares and while the collection comprises a number of secret share (s) below the threshold, the secure system elects a further authentication factor and executes a further checking step with the further authentication factor.

The secure system 40 is adapted to perform a generating step in which, once the number of secret shares belonging to the collection has reached the threshold, the secure system builds the sensitive data from the secret shares of the collection by applying a predefined algorithm associated with the secret sharing scheme initially used to generated the secret shares.

Figure 4:
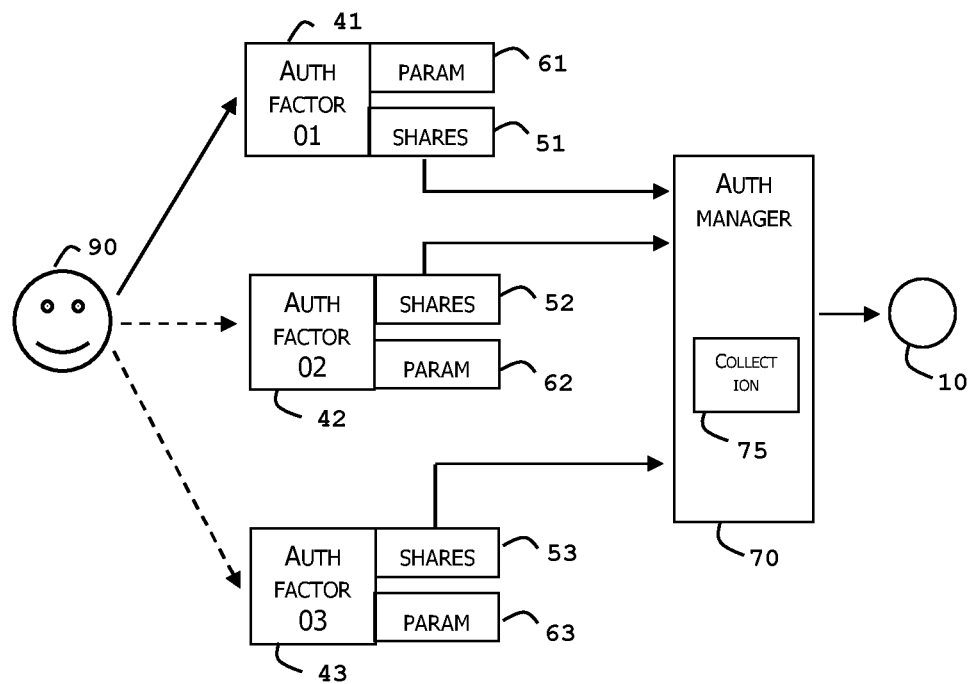
FIG. 4 shows schematically interactions between entities when managing a sensitive data according to an example of the invention.

FIG. 4 depicts a diagram showing an exemplary embodiment of the process to manage the protected sensitive data by using a secure system.

In this embodiment, the secure system comprises a set of three enabled authentication factors 41, 42 and 43.

Preferably, the secure system may be adapted to generate a set of secret shares from the sensitive data 10 in a preliminary phase. The secure system may be set with a default secret sharing scheme. In another embodiment, the secure system may choose a secret sharing scheme according to a data provided by an external entity like a user or computer.

The preset secret sharing scheme may be a threshold-based scheme like the Shamir's secret sharing scheme, the Asmuth-Bloom or the Blakley's secret sharing scheme. For such a scheme, a threshold is defined by the minimum number of shares required to rebuild the sensitive data 10.

Preferably, the secret sharing scheme used by the secure system is the Shamir's secret sharing scheme.

The secure system may be configured to identify as many groups as enabled authentication factors and to uniquely assign one of the groups to one source code and the other group to the other source code.

It is to be noted that the total number of secret shares assigned to the authentication factors must be equal to or greater than the threshold defined by the used secret sharing scheme for the generated secret shares.

In one embodiment, the used secret sharing scheme may be based on a known secret splitting scheme with one or more additional transformation operations in order to customize the way to retrieve the hidden sensitive data. In such an embodiment, the secure system must apply opposite transformation operations to the original sensitive data before the generation of the set of secret shares from original sensitive data.

In the example of FIG. 4, a group 51 of secret share(s) has been allocated to the authentication factor 41, a group 52 of secret share(s) has been allocated to the authentication factor 42 and a group 53 of secret share (s) has been allocated to the authentication factor 43.

Preferably, the groups of secret shares are disjoint groups.

The secure system may be configured to generate specific parameters that specify how many secret shares are made available depending on the score computed by its associated authentication factor.

In the example of FIG. 4, a specific parameter 61 has been allocated to the authentication factor 41, a specific parameter 62 has been allocated to the authentication factor 42 and a specific parameter 63 has been allocated to the authentication factor 43.

For instance, the authentication factor 43 may be designed to check a PIN code entered by the user 90 and its associated specific parameter 63 may defined the following rules:
    if only one attempt has been made to successfully verify the PIN code then all secret shares of the group 53 are made available to rebuild the sensitive data (e.g. they are added to the collection 75);
    if two attempts have been made to successfully verify the PIN code, then one secret share of the group 53 is made available; and
    if three or more attempts have been made to successfully verify the PIN code then no secret share of the group 53 is made available.

Obviously, if the PIN code has not been successfully verified, then no secret share of the group 53 is made available.

The secure system may also be adapted to manage the addition or removal of authentication factor (s) as described above.

Alternatively, the steps described at FIG. 5 (i.e. generation of secret shares, identification of groups of shares, allocation of shares to the authentication factors and definition of specific parameter of each authentication factor) may be performed by another secure device different from the secure system 40.

In the example of FIG. 4, the secure system comprises an Authentication manager 70 adapted to manage the collection 75 of secret shares released according to the result of verification done by the authentication factors. The Authentication manager 70 is adapted to elect an authentication factor (among 41-43), to retrieve the subset of secret shares made available by the elected authentication factor, to check whether the number of secret shares of the collection 75 reached the threshold and to rebuild the sensitive data by 10 applying the algorithm corresponding to the share scheme previously used to generate the secret shares.

In the example of FIG. 4, the authentication factor 41 has been elected first. It is to be noted that the number of authentication factors whose output (score and released shares) required to rebuild the sensitive data may vary.

Although the examples describes previously relate to a single sensitive data, the invention may apply to protect access to several sensitive data using a single or several secret share schemes.

The invention allows to enhance protection of sensitive data or digital assets secured by the sensitive data.

An advantage of the invention is to take into account the quality level of the verification of user's input performed by an authentication factor.

It must be understood, within the scope of the invention, that the above-described embodiments are provided as non-limitative examples.

The invention is not limited to the described embodiments or examples. In particular, the features described in the presented embodiments and examples may be combined.

The architecture of the secure system 40 shown at FIG. 3 is provided as examples only. This architecture may be different. For instance, the secure system may include authentication factors as external peripheral devices coupled to a hardware computer.

The invention allows to dynamically step-up the based on scenarios in which authentication multiple retry attempts occur or authentication barely exceeds the biometric authentication threshold.

With the evolution of multiple biometric authentications possible in the hand-held devices, the invention allows to seamlessly make use of combination of biometrics instead of relying on only one factor at a time. Thanks to the invention, seamless and strong authentication may be achieved by dynamically having multi-factor or single factor depending on the strength of the authentication and other settings.

The invention claimed is:

1. A computer-implemented method for managing a sensitive data, wherein each authentication factor in a set of authentication factors has been uniquely assigned a corresponding group from a plurality of groups, wherein each of the groups in the plurality of groups contains one or more secret shares from a plurality of secret shares generated by using a secret sharing scheme, wherein that the method comprises:
   a checking step in which a user provides an input, a verification of said input is performed by using an authentication factor from the set of authentication factors to generate a score reflecting a level of confidence of the verification and adding a subset of the one or more secret share(s) of the corresponding group assigned to the authentication factor to a collection, said subset of the one or more secret shares of the corresponding group depending on both said score and a predefined parameter associated with the authentication factor,
   a controlling step in which while the collection comprises a number of secret share(s) which is below a threshold, a further authentication factor is elected from the set of authentication factors and a further checking step is executed with the further authentication factor and a further corresponding group of one or more secret shares, and
   a generating step in which, once the number of secret shares belonging to the collection has reached the threshold, the sensitive data is built from the secret shares of the collection by applying a predefined algorithm associated with the secret sharing scheme.

2. The method according to claim 1, wherein the sensitive data is an authentication key and wherein the user is authenticated by using the sensitive data.

3. The method according to claim 2, wherein, once the user has been successfully authenticated, a plurality of new groups of secret shares generated by using the secret sharing scheme is identified, wherein a new set is provided by adding a new authentication factor to said set of authentication factors and wherein each authentication factor of said new set is uniquely assigned a group of said plurality of new groups.

4. The method according to claim 2, wherein, once the user has been successfully authenticated, a plurality of new groups of secret shares generated by using the secret sharing scheme is identified, wherein a new set is provided by removing one authentication factor from said set of authentication factors and wherein each authentication factor of said new set is uniquely assigned a group of said plurality of new groups.

5. The method according to claim 1, wherein at least one authentication factor of said set is a biometric authentication factor.

6. The method according to claim 1, wherein the sensitive data (10) is a key and wherein the sensitive data is used to decipher an encrypted digital asset.

7. The method according to claim 1, wherein the preset secret sharing scheme is the Shamir's secret sharing scheme or Blakley's secret sharing scheme.

8. The method according to claim 1, wherein the score is a number of verification attempt or a percentage of match of a captured biometric value with a reference biometric value.

9. A secure system comprising a processing unit and a storage area, wherein each authentication factor in a set of authentication factors has been uniquely assigned a corresponding group from a plurality of groups, wherein each of the groups in the plurality of groups contains one or more secret shares from a plurality of secret shares generated by using a secret sharing scheme and in that the storage area comprises instructions that, when executed by said processor, cause said secure system to:
   perform a checking step in which the secure system gets an input from a user, the secure system performs a verification of said input by using an authentication factor from the set of authentication factors and generates a score reflecting a level of confidence of the verification, the secure system adds to a collection (76) a subset of the one or more secret share(s) of the corresponding group assigned to the authentication factor, said subset of the one or more secret shares of the corresponding group depending on both said score and a predefined parameter associated with the authentication factor,
   perform a controlling step in which while the collection comprises a number of secret share(s) which is below a threshold, the secure system elects a further authentication factor from the set of authentication factors and executes a further checking step with the further authentication factor and a further corresponding group of one or more secret shares, and
   perform a generating step in which, once the number of secret shares belonging to the collection has reached the threshold, the secure system builds the sensitive data from the secret shares of the collection by applying a predefined algorithm associated with the secret sharing scheme.

10. The secure system according to claim 9, wherein the sensitive data is an authentication key and wherein the secure system authenticates the user by using the sensitive data.

11. The secure system according to claim 10, wherein, once the user has been successfully authenticated, the secure system identifies a plurality of new groups of secret shares generated by using the secret sharing scheme, wherein the secure system provides a new set by adding a new authentication factor to said set of authentication factors and wherein the secure system uniquely assigns each authentication factor of said new set a group of said plurality of new groups.

12. The secure system according to claim 10, wherein, once the user has been successfully authenticated, the secure system identifies a plurality of new groups of secret shares generated by using the secret sharing scheme, wherein the secure system provides a new set by removing one authentication factor from said set of authentication factors and wherein the secure system uniquely assigns each authentication factor of said new set a group of said plurality of new groups.

13. The secure system according to claim 9, wherein at least one authentication factor of said set is a biometric authentication factor.

14. The secure system according to claim 9, wherein the sensitive data is a key and wherein the secure system uses the sensitive data to decipher an encrypted digital asset.

15. The secure system according to claim 9, wherein the preset secret sharing scheme is Shamir's secret sharing scheme or Blakley's secret sharing scheme.

\* \* \* \* \*